(No Model.)
R. SENNER.
FASTENING FOR BRACELETS.
No. 564,654. Patented July 28, 1896.
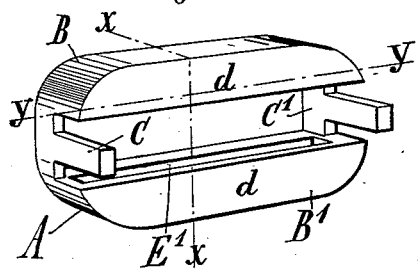
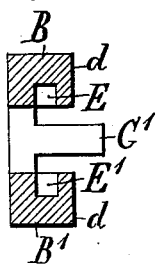
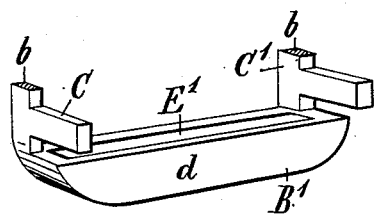
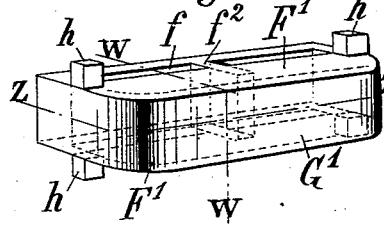
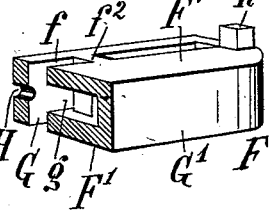
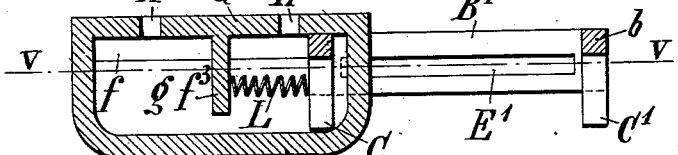
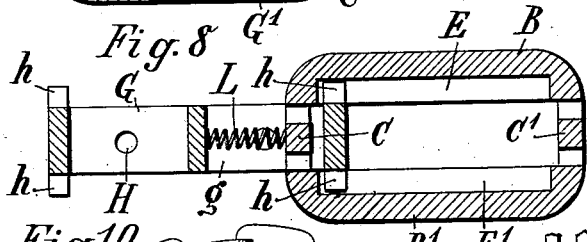
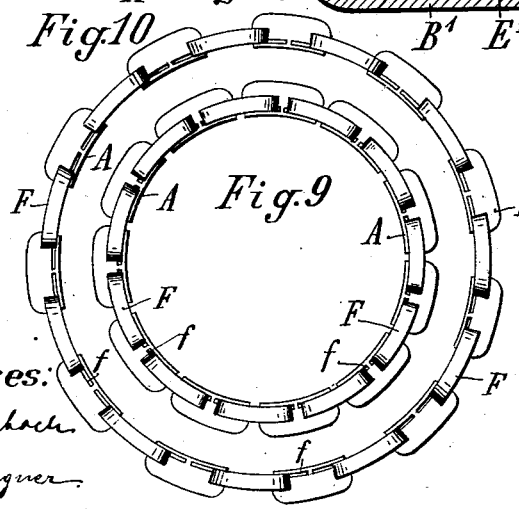
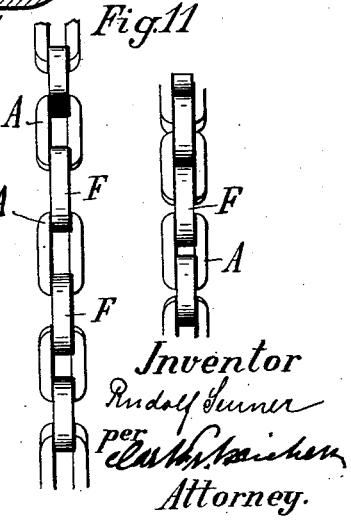
Witnesses:
Inventor
Rudolf Senner
per
Attorney.

UNITED STATES PATENT OFFICE.

RUDOLF SENNER, OF PFORZHEIM, GERMANY.

FASTENING FOR BRACELETS.

SPECIFICATION forming part of Letters Patent No. 564,654, dated July 28, 1896.

Application filed February 25, 1896. Serial No. 580,740. (No model.)

*To all whom it may concern:*

Be it known that I, RUDOLF SENNER, a citizen of the Grand Duchy of Baden, and a resident of Pforzheim, in the Grand Duchy of Baden and German Empire, have invented certain new and useful Improvements in Fastenings for Bracelets, of which the following is a specification.

The invention relates to a bracelet adapted to be enlarged and thus drawn over the hand, whereby the inconveniences of the locks heretofore used are avoided.

The new bracelet forms a completely-closed ring, and is composed of single links joined together and in such a manner that one link catches with projections into convenient grooves or slits of the next hollow-shaped link, and these pairs of links are connected by springs provided in the hollow links, whereby the links of such a bracelet are always contracted to the least diameter and if enlarged will fit well to the arm by the elasticity of the springs.

In the accompanying drawings, Figure 1 shows a perspective view of one kind of link. Fig. 2 is a cross-section on the line $x\,x$; Fig. 3, a section along the line $y\,y$. Fig. 4 shows the other kind of link in perspective view. Fig. 5 is a cross-section on the line $z\,z$; Fig. 6, a section on $w\,w$. By Fig. 7 a connection of a pair of links is shown in horizontal section, and Fig. 8 shows a cross-section on $v\,v$. Fig. 9 is the plan view of a complete bracelet in contracted, Fig. 10 in enlarged, state. Fig. 11 is a front view of a number of links connected in the same manner.

The link A, Fig. 1, consists of two plates B B', connected by the side pieces C C' of T-like form, so that said pieces C C' are joined with the plates B·B' only by the small parts $b$, (shown in cross-section in Fig. 3,) while between the small sides of the plates B B' and the plates C C' remain the slits D D'. The plates C C' project beyond the front faces $d\,d$, as shown in Fig. 2. The inner sides of plates B and B' have grooves E E', respectively.

The other link, F, (represented by Figs. 4 to 6,) consists of a rectangular hollow box, the parallel faces F' F'' of which are pierced by the slits $f$, interrupted in the middle by the cross-pieces $f^2$, the latter forming within the box a cross-wall $f^3$, which connects the plates F' F'' and the side wall G, but has no connection with the wall G', so that the compartments $g\,g$, formed by $f^3$, have communication by the slit $g'$. On the faces F' F'' are provided, adjacent the outer ends of the slits $f$, the pins or projections $h$, and the wall G is perforated by the holes H.

The connection of two links A and F is shown by Figs. 7 and 8. The projections $h$ of link F catch into the grooves E E' of link A, while the small rectangular parts $b$ of the side walls C C' of the latter link are guided in the slits $f$, so that the plates C C' are housed in the compartments $g\,g$, and the plates B B' comprise and cover the plates F' F''. In practice of manufacture and mounting of such bracelets the plates B B' are in beginning not in connection with the pieces $b$ and will be soldered upon them after having put the plates C C' into the link F, whose top plate F'' is also soldered, not sooner upon the main body than said plates C C' are put in. The latter are connected with the cross-wall $f^3$ by springs L, adapted to draw the links toward each other, as above mentioned. The holes H are provided for introducing the springs L into the links.

It is evident that the forms and shapes of the links can be modified and executed in any artistical manner and style.

What I claim is—

A bracelet consisting of two kinds of links, the one link F forming a hollow prismatical box, having slits $f$ and projections $h$, the interior being divided by a cross-wall $f^3$ into two compartments and the other link consisting of two parallel plates B B' having grooves along their inner sides and being connected by T-shaped end walls C C', the link thus forming a rectangular frame; said links being coupled two and two so that the end walls C C' are housed in the interior of the hollow link F and are connected with the cross-wall $f^3$ of the latter by springs L, substantially as set forth.

In testimony that I claim the foregoing as my invention I have signed my name in presence of two subscribing witnesses.

RUDOLF SENNER.

Witnesses:
WM. HAHN,
CHRISTIAN BAUER.